United States Patent
Bui

(10) Patent No.: US 6,771,511 B2
(45) Date of Patent: Aug. 3, 2004

(54) PLUGGABLE OPTICAL TRANSCEIVER WITH PIVOTING ACTUATOR LEVER

(75) Inventor: Hy Bui, Glendale, CA (US)

(73) Assignee: Optical Communication Products, Inc., Woodland Hills, CA (US)

( * ) Notice: Subject to any disclaimer, the term of this patent is extended or adjusted under 35 U.S.C. 154(b) by 0 days.

(21) Appl. No.: 10/249,234

(22) Filed: Mar. 25, 2003

(65) Prior Publication Data

US 2003/0198026 A1 Oct. 23, 2003

Related U.S. Application Data

(60) Provisional application No. 60/374,414, filed on Apr. 22, 2002.

(51) Int. Cl.[7] .............................. H05K 7/12; H05K 5/02
(52) U.S. Cl. ....................... 361/728; 361/730; 361/752; 361/754
(58) Field of Search ................................ 361/728–731, 361/752, 754, 801, 740, 741, 726; 174/50; 455/349

(56) References Cited

U.S. PATENT DOCUMENTS

| 6,229,708 | B1 | * | 5/2001 | Corbin et al. ............... 361/728 |
| 6,430,053 | B1 | * | 8/2002 | Peterson et al. ............. 361/728 |
| 6,434,015 | B1 | * | 8/2002 | Hwang ....................... 361/754 |
| 6,556,445 | B2 | * | 4/2003 | Medina ....................... 361/728 |
| 6,556,446 | B1 | * | 4/2003 | Hwang ....................... 361/728 |
| 6,570,768 | B2 | * | 5/2003 | Medina ....................... 361/747 |
| 6,612,858 | B1 | * | 9/2003 | Stockhaus .................... 439/352 |
| 2002/0093796 | A1 | | 7/2002 | Medina |
| 2002/0114141 | A1 | | 8/2002 | Medina |

* cited by examiner

*Primary Examiner*—David Martin
*Assistant Examiner*—Dameon E. Levi
(74) *Attorney, Agent, or Firm*—Barlow, Josephs & Holmes, Ltd.

(57) ABSTRACT

A pluggable optical transceiver having a pivotable actuator assembly for quickly and easily removing the transceiver from a receptacle cage is provided. The actuator assembly includes a pivotable lever arm and a slide member that can slide in a forward and rearward direction. Force is first applied to the actuator lever so that it pivots and rotates to a different position. Then, as force is applied to the pivoted actuator lever, the slide member slides rearwardly causing the transceiver to become disengaged from the receptacle. In this manner, the transceiver is released and can be removed easily from the receptacle.

13 Claims, 5 Drawing Sheets

PLUGGABLE OPTICAL TRANSCEIVER WITH PIVOTING ACTUATOR LEVER

CROSS REFERENCE TO RELATED APPLICATIONS

This application claims the benefit of U.S. Provisional Application No. 60/374,414 having a filing date of Apr. 22, 2002.

BACKGROUND OF INVENTION

The present invention relates generally to pluggable optical transceivers. Particularly, the invention relates to a pivoting actuator release lever for quickly and easily removing a small form factor pluggable (SFP) transceiver from a transceiver-receptacle cage assembly.

Pluggable optical transceivers are known in the art, and have been the subject of various industry standards and sourcing agreements between common vendors. In particular, multiple vendors have entered into a multi-source agreement (MSA) setting forth common standards and specifications for small form factor pluggable (SFP) transceivers. By way of review, an optical transceiver is an integrated fiber optic component including an optical transmitter and an optical receiver. The pluggable transceiver includes a first end with a fiber optic connector and a second end with an electrical connector. For the SFP transceiver, the fiber optical connector is a LC-type duplex connector. The electrical connector is a card edge connector that is received into a female electrical connector housed inside a receptacle. The receptacle assembly is mounted on a daughter card of a host system. A common mechanical and electrical outline for the SFP transceiver is defined by the MSA. However, each individual manufacturer (vendor) is responsible for its own development and manufacturing of the SFP transceiver including developing a method for releasing and removing the transceiver from the receptacle assembly.

The MSA provides some specifications for securing the transceiver to the receptacle cage. Particularly, the MSA specifies a spring-loaded latching tab in the receptacle that engages a standard locking detent on the bottom surface of the transceiver. When the transceiver is slidably inserted into the receptacle, the detent engages the latching tab and the transceiver is physically retained in place by the interlocking engagement of the detent to the latching tab.

Turning to the subject of the present invention, the MSA does not provide any standard mechanisms for releasing and removing the transceiver from the receptacle cage. In this regard, the present invention provides a novel actuator assembly for disengaging the latching tab from the detent, thus allowing a person to easily remove the transceiver from the receptacle.

SUMMARY OF THE INVENTION

The actuator assembly of the present invention comprises several components. One component is a slide member slidably mounted on the bottom surface of the transceiver. The slide member is located adjacent to the locking detent on the transceiver. The slide member has a forward-facing end, a rear-facing end, and two opposing side ends. Each side end of the slide member includes a sliding pin projecting therefrom. The rear end of the slide member has angled cam surfaces.

Initially, the transceiver module is locked in the receptacle cage. The actuator assembly includes two "L-shaped" vertical arms containing slotted portions. The slots contain a rigid stop means which engages the sliding pins, thereby maintaining the slide member in a forward, locked position. The slide member remains in this initial locked position, until sufficient force is applied to the slide member that causes it to slide towards and engage a latching tab in the receptacle cage.

The actuator assembly further comprises an actuator lever arm pivotably attached to the slide member. When the transceiver is locked in the receptacle cage, the lever arm is in an upright, latched position. To remove the transceiver from the receptacle cage, a person first pulls on the lever arm causing the arm to rotate in a downward and forward direction to a new position. Then, the person pushes on the lever arm, thereby causing the slide member to move in a linear direction rearwardly towards the latching tab in the receptacle cage. The angled cam-surfaces of the slide member engage the latching tab causing the tab to become disengaged from the locking detent. In this manner, the transceiver is released from the receptacle cage. After the transceiver is released, kick-out springs in the receptacle cage automatically force the transceiver to slide forward. The user can then pull on the lever arm to remove the transceiver from the receptacle cage easily.

Among the objects of the instant invention are: providing an optical transceiver module having an integrated actuator assembly; providing an actuator assembly that can pivot and rotate from a latched position to an unlatched position; providing an actuator assembly having a slide member that can engage a latching tab in a receptacle cage to unlock a transceiver module from the cage; and providing an actuator assembly, wherein the profile of the assembly is substantially within the defined dimensions of the transceiver module.

Other objects, features, and advantages of the invention shall become apparent as the description thereof proceeds when considered in connection with the accompanying illustrative drawings.

BRIEF DESCRIPTION OF DRAWINGS

In the drawings which illustrate the best mode presently contemplated for carrying out the present invention.

DETAILED DESCRIPTION

Figure 1:
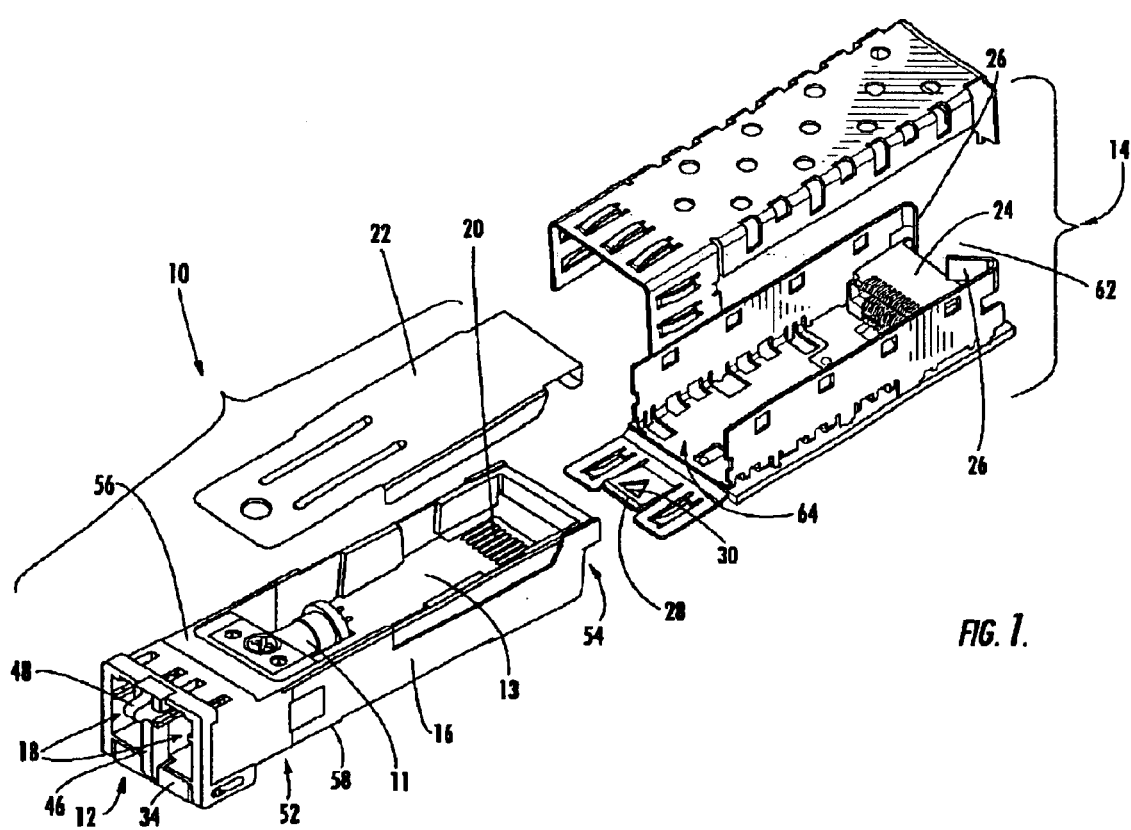
FIG. 1 is a perspective top view of a two-part receptacle cage and a transceiver module having an actuator assembly in accordance with the present invention.

Referring now to the drawings, the pluggable transceiver module of the instant invention is illustrated and generally indicated at 10 in FIGS. 1–5. As will be hereinafter more fully described, the instant small format pluggable (SFP) transceiver module 10 includes an integrated actuator assembly generally indicated at 12 for disengaging the transceiver 10 from a corresponding receptacle cage generally indicated at 14.

Referring to FIG. 1, the optical transceiver module 10 is essentially an integrated fiber optic component including an optical transmitter 11 and an optical receiver (not shown). The pluggable transceiver 10 includes a plastic housing frame 16 having a first end 52 with fiber optic connector ports 18 located therein, and an opposite second end 54 with an electrical edge connector 20 projecting therefrom. For the pluggable transceiver 10, the fiber optic connector ports 18 are an LC-type duplex connector.

Figure 4:
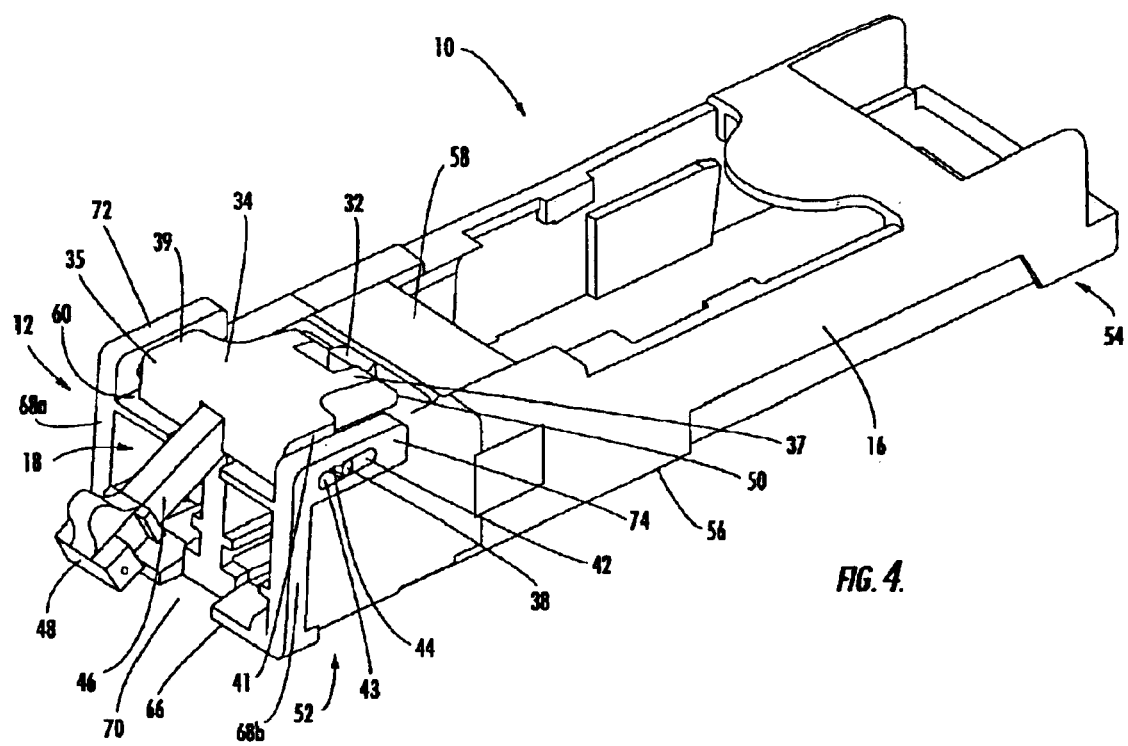
FIG. 4 is a perspective bottom view of a transceiver module of the present invention showing the actuator assembly in an unlatched, partially rotated position.
Figure 5:
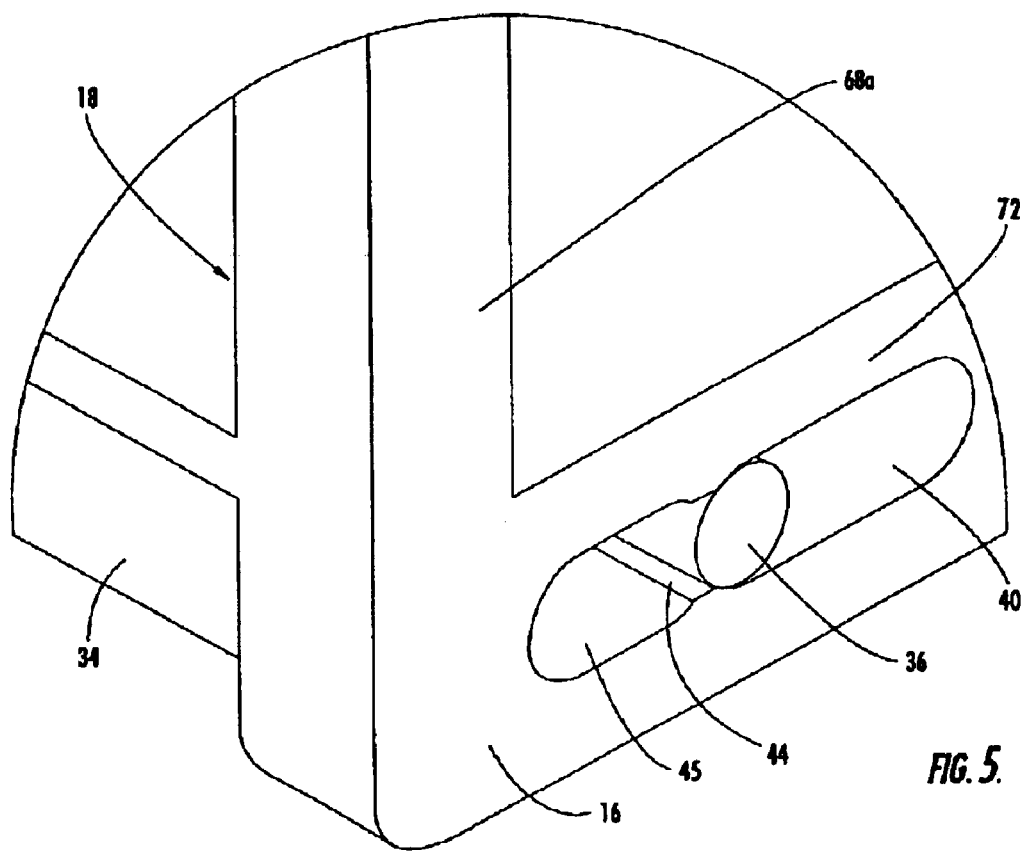
FIG. 5 is a close-up view of the L-shaped vertical arm of the actuator assembly shown in FIG. 3.

The housing 16 of the transceiver 10 includes an upper (top) surface 56 and lower (bottom) surface 58. The lower surface 58 of the housing 16 includes a slide member 34 and a locking detent 32 as illustrated in FIG. 4. The locking detent 32 secures the transceiver 10 within the receptacle cage 14 as described in further detail below. More particularly, the slide member 34 and locking detent 32 are mounted in a channel 60 that extends longitudinally along at least a portion of the bottom surface 58 of the transceiver 10. The locking detent 32 is located at the rear of the longitudinal channel 60 adjacent to the slide member 34.

As shown in FIG. 1, the optical transmitter 11 and optical receiver are mounted on a circuit board 13 that is received inside the housing frame 16 of the transceiver 10. The rear edge of the circuit board 13 forms the electrical edge connector 20 that protrudes from the open end of the housing frame 16. A metallic cover 22 encloses the top surface 56 of housing frame 16 and provides electromagnetic interference (EMI) shielding and case grounding to the chassis ground. A portion of the bottom surface 58 of the housing 16 is enclosed by a separate plastic cover (not shown). The outer dimensions of the male plug end of the LC-type duplex fiber optic cable are standard, and therefore the corresponding female fiber optic connector ports must also be standard dimensions. The first end 52 of the housing frame 16 is generally rectangular, slightly longer side-to-side, when viewed from the front. The width and height of the housing frame 16 are fixed by SFP standards. The two connector ports 18 are symmetrically positioned and arranged within the rectangular outline. Latching surfaces are provided within the connector ports 18 to permit engagement with the standard latch members of the fiber optic cable. The arrangement of the actuator assembly 12 mounted on the first end 52 of the transceiver housing 16 is further described below.

As shown in FIG. 1, the electrical edge connector 20 is received into a female electrical connector 24 housed inside the receptacle assembly 14 which is in turn mounted on a daughter card of a host system (not shown). The receptacle cage 14 includes kick-out springs 26 located at the rear end 62 of the cage 14 which engage the rear end 54 of the transceiver 10 and bias the transceiver 10 outwardly. A spring-loaded latching tab 28 is located at the open forward end 64 of the receptacle cage 14. The latching tab 28 includes an opening or aperture 30 therein for locking the detent 32 of the transceiver 10. In FIG. 1, the opening 30 is shown as having a triangular shape, but other designed openings are suitable.

During insertion of the transceiver module 10 into the receptacle cage 14, the transceiver slides into the receptacle 14 and the locking detent 32 catches and locks with the opening 30 in the latching tab 28. The transceiver 10 is secured to the receptacle 14 by means of locking detent 32 engaging and entering the opening 30 in the latching tab 28. In this manner, the transceiver 10 is locked within the receptacle 14. Basically, a person can insert the transceiver module 10 into the receptacle cage 14 by pushing the transceiver 10 into the cage until he or she feels the resistance of the kick-out springs 26 located at the rear of the cage 14. Then, the person should push the transceiver 10 further until feeling the "click" of the detent 32 locking with the opening 30.

Figure 3:
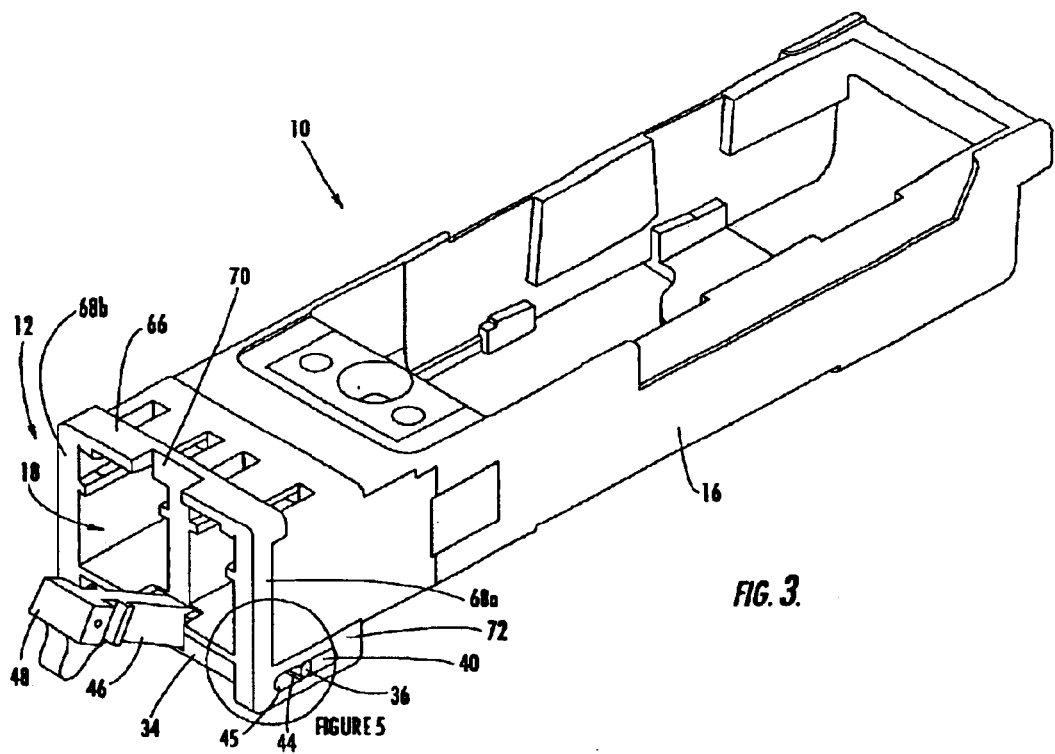
FIG. 3 is a perspective top view of a transceiver module of the present invention showing the actuator assembly in an unlatched, partially rotated position.

In order to release and remove the transceiver module 10 from the receptacle cage 14, the transceiver 10 of the present invention includes an actuator assembly 12. In general, the actuator assembly 12 has an integrated "U-shaped" structure. Particularly, the actuator assembly 12 includes a horizontal cross-bar 66, and two "L-shaped" vertical arms 68a and 68b depending downwardly therefrom. The horizontal cross-bar 66 includes a notched portion 70 as shown in FIG. 3. The foot segment 72 of L-shaped vertical arm 68a includes a slotted portion 40 as shown in more detail in FIG. 5, and the foot segment 74 of L-shaped vertical arm 68b includes a slotted portion 42 as shown in FIG. 4. The slots 40 and 42 contain a rigid stop means 44 which engages the sliding pins 36 and 38 as further described below.

The two L-shaped vertical arms 68a and 68b remain flush with the outside surface of the transceiver housing 16. This arrangement maintains the entire transceiver package within generally accepted SFP outer dimensional specifications.

The actuator assembly 12 comprises two other components, particularly a slide member 34 and an actuator lever arm 46.

Figure 2:
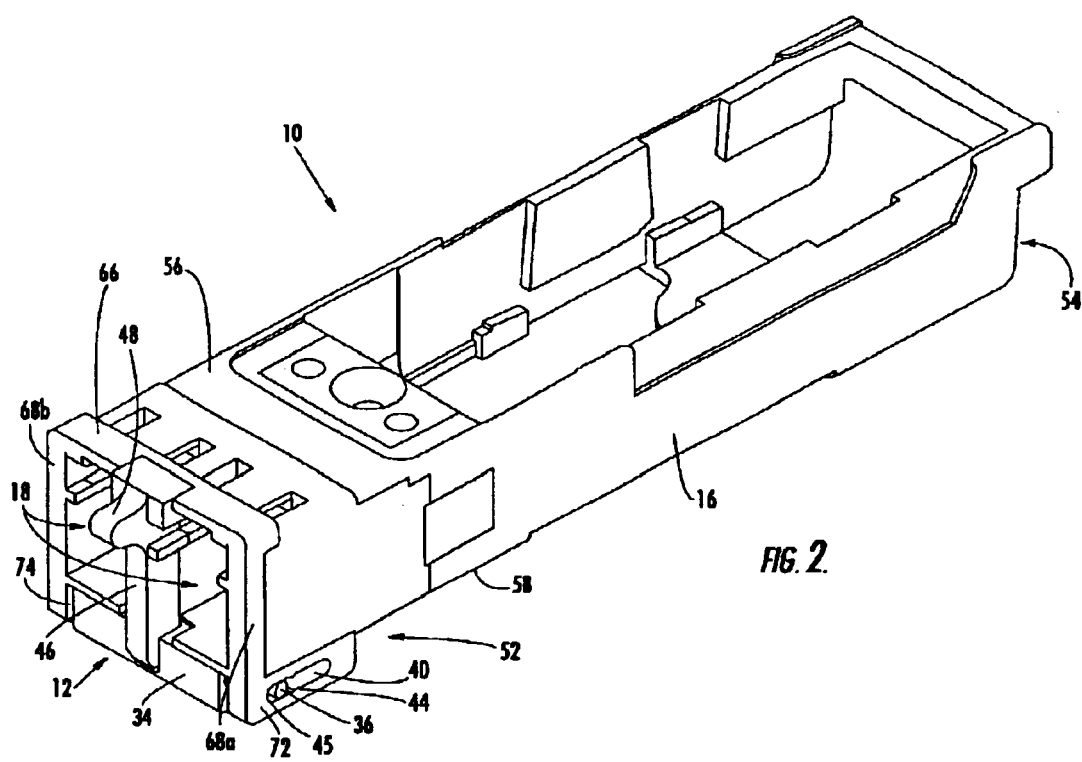
FIG. 2 is a perspective top view of a transceiver module of the present invention showing the actuator assembly in a latched position.

The actuator lever arm 46 is pivotably attached to the slide member 34 as shown in detail in FIGS. 2–4.

Regarding the slide member 34, this component is slidably mounted in a channel 60 extending along the lower surface 58 of the housing frame 16. The slide member 34 is located adjacent to the locking detent 32. The slide member 34 has a forward-facing end 35, a rear-facing end 37, and two opposing side ends 39 and 41. The side end 39 of the slide member 34 includes a sliding pin 36 projecting therefrom, and the side end 41 includes a sliding pin 38 projecting therefrom. The rear end 37 of slide member 34 has angled cam surfaces 50.

As illustrated in FIG. 2, the transceiver 10 is locked initially in the receptacle cage 14 with the actuator lever arm 46 in a closed, upright position. Particularly, the actuator arm 46 is latched to the notch 70 (FIG. 3) in the cross-bar 66 of the actuator assembly 12. The slots 40 and 42 of the actuator assembly contain a rigid stop means 44 which engages the sliding pins 36 and 38, thereby maintaining the slide member 34 in a forward, resting position. The rigid stop means 44 is located within each of the slots 40 and 42 at a point about one-third of the distance from the forward ends 43 and 45 of each of the slots 40 and slot 42. The slide member 34 remains in this initial locked position until sufficient force is exerted on the member 34 to cause it to slide rearwardly towards the latching tab 28 in the receptacle cage 14 and release the transceiver module 10 as further described below.

To remove the transceiver 10 from the receptacle cage 14, a person first pulls on the actuator lever arm 46 so that it unlatches. The lever arm 46 is then pulled so that it pivots and rotates in a downward and forward direction to a new position, for example, the angled position as illustrated in FIGS. 3 and 4. Then, the person pushes on the lever arm 46 and forces the slide member 34 to slide in a linear direction rearwardly towards the latching tab 28 in the receptacle cage 14. The force applied to the slide member 34 causes the sliding pins 36 and 38 of the slide member 34 to slide rearwardly over the rigid stop means 44 located in slots 40 and 42.

The slide member 34 has angled cam surfaces 50 at its rear end 37 that engage the surface of the latching tab 28, thereby causing the locking detent 32 to become separated from the opening 30 and releasing the transceiver 10 from the receptacle cage 14. With the locking detent 32 and latching tab 28 disengaged, the kick-out springs 26 automatically force the transceiver 10 to spring outwardly. The user can then simply pull on the lever arm 46 to remove the transceiver 10 from the receptacle cage 14.

As shown in FIGS. 1–4, the actuator lever arm 46 can include a finger tab 48 that arcs slightly forwardly. The finger tab 48 provides easy access to the lever arm 46. A person can use his or her fingers to pull on the finger tab 48 and unlatch the lever arm 46. The lever arm 46 pivots and begins to rotate in a slightly downward and forward direction. If desired, the rotation of the lever arm 46 can be completed by a person grasping and pulling directly on the arm 46. Then, the person can push on the lever arm 46 directly or by means of the finger tab 48 to force the slide member 34 to slide towards and engage the latching tab 28 in the receptacle cage 14.

The actuator release lever 46 of the present invention provides an effective means for directing the slide member 34 towards the latching tab 28 in the receptacle cage 14 in order to unlock the transceiver 10. However, it should be understood that a person does not necessarily have to use the lever arm 46 to push the slide member 34. If desired, the person may push directly on the slide member 34 to force the slide member 34 towards the latching tab 28 and disengage the locking detent 32 from the opening 30. By directly exerting force on the slide member 34 in this manner, the transceiver 10 can be released from the receptacle cage 14.

While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A pluggable optical transceiver module, comprising:
    a housing having a first end, an opposing second end, an upper surface, and a lower surface, said lower surface having a locking detent projecting therefrom for engaging an opening in a latching tab located in a receptacle cage; and
    an actuator assembly comprising:
        (i) an actuator lever arm pivotably attached to a slide member, wherein force applied to the lever arm causes the arm to pivot; and
        (ii) a slide member adapted to slide towards and engage the latching tab in the receptacle as force is applied to the pivoted lever arm, thereby causing the detent to become disengaged from the opening and releasing the transceiver from the receptacle.

2. The transceiver module of claim 1, wherein the actuator assembly comprises a horizontal cross-bar connected to two vertical side arms.

3. The transceiver module of claim 2, wherein the horizontal cross-her contains a notched portion for latching the actuator lever arm.

4. The transceiver module of claim 2, wherein each of the vertical side arms has a "L-shaped" structure and contains a slotted portion.

5. The transceiver module of claim 4, wherein the slotted portion of each side arm contains a sliding pin and a rigid stop means.

6. The transceiver module of claim 1, wherein the first end of the transceiver housing has a pair of fiber optic connector ports located therein and the second end of the housing has an electrical edge connector projecting therefrom.

7. The transceiver module of claim 1, wherein a metallic cover encloses the upper surface of the transceiver housing.

8. The transceiver module of claim 1, wherein the slide member is adapted to slide in a forward and rearward direction.

9. The transceiver module of claim 1, wherein the slide member has an angled surface for engaging the latching tab.

10. The transceiver module of claim 1, wherein the slide member is disposed in a channel extending along the lower surface of the transceiver housing.

11. A pluggable optical transceiver and receptacle package assembly, comprising:
    a receptacle cage for receiving the transceiver, said cage having a first end and an opposing second end, wherein the first end has a latching tab containing an opening therein; and
    a housing having a first end, an opposing second end, an upper surface, and a lower surface, said lower surf hoe having a locking detent projecting therefrom for engaging an opening in a latching tab located in a receptacle cage; and
    an actuator assembly comprising:
        (i) an actuator lever arm pivotably attached to a slide member, wherein force applied to the lever arm causes the arm to pivot; and
        (ii) a slide member adapted to slide towards and engage the latching tab in the receptacle as force is applied to the pivoted lever arm, thereby causing the detent to become disengaged from the opening and releasing the transceiver from the receptacle.

12. The transceiver and receptacle package assembly of claim 11, wherein the second end of the receptacle cage has a pair of kick-out springs for releasing the transceiver.

13. The transceiver and receptacle package assembly of claim 11, wherein the assembly is mounted on a circuit board.

* * * * *